(12) United States Patent
Park et al.

(10) Patent No.: US 10,770,033 B2
(45) Date of Patent: Sep. 8, 2020

(54) APPARATUS AND METHOD FOR VISUALLY PROVIDING INFORMATION REGARDING CONTENTS INDICATING TIME INTERVAL

(71) Applicant: Samsung Electronics Co., Ltd., Suwon-si, Gyeonggi-do (KR)

(72) Inventors: Hye Ju Park, Suwon-si (KR); Ju Young Kim, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 16/193,507

(22) Filed: Nov. 16, 2018

(65) Prior Publication Data

US 2019/0156790 A1    May 23, 2019

(30) Foreign Application Priority Data

Nov. 17, 2017    (KR) .......................... 10-2017-0154059

(51) Int. Cl.
*G09G 5/34* (2006.01)
*G09G 5/14* (2006.01)
(Continued)

(52) U.S. Cl.
CPC ............. *G09G 5/34* (2013.01); *G06F 3/0485* (2013.01); *G09G 5/14* (2013.01); *G09G 5/26* (2013.01); *G09G 5/377* (2013.01); *G06F 3/04842* (2013.01); *G06F 2203/04803* (2013.01); *G09G 2340/0478* (2013.01); *G09G 2340/12* (2013.01); *G09G 2354/00* (2013.01)

(58) Field of Classification Search
CPC ............................... G06F 3/0485; G09G 5/34
See application file for complete search history.

(56) References Cited

U.S. PATENT DOCUMENTS

| 7,958,456 B2 | 6/2011 | Ording et al. |
| 8,935,629 B2 | 1/2015 | Ying et al. |
| (Continued) | | |

FOREIGN PATENT DOCUMENTS

| EP | 2731005 A3 | 5/2014 |
| WO | 2013063349 A1 | 5/2013 |
| WO | 2016182328 A1 | 11/2016 |

OTHER PUBLICATIONS

Extended European Search Report dated Mar. 13, 2019, issued in a counterpart European application No. 18206853.6-1213.

*Primary Examiner* — Phi Hoang
(74) *Attorney, Agent, or Firm* — Jefferson IP Law, LLP

(57) ABSTRACT

An electronic device for indicating information and a method therefor are provided. The electronic device includes a display, a processor electrically connected to the display, and a memory electrically connected to the processor and including instructions. The instructions, when executed by the processor, cause the processor to display contents indicating a time interval on a first region of a screen displayed by the display, display, in the contents, a text representing information regarding the contents, receive a user input for scrolling the first region, determine whether a part of the text is located on a second region included in the first region, and fix the text on the second region during a scroll operation according to the user input when the part of the text is located on the second region.

19 Claims, 14 Drawing Sheets

(51) Int. Cl.
  *G09G 5/26* (2006.01)
  *G09G 5/377* (2006.01)
  *G06F 3/0485* (2013.01)
  *G06F 3/0484* (2013.01)

(56) References Cited

U.S. PATENT DOCUMENTS

| | | |
|---|---|---|
| 9,134,883 B2 | 9/2015 | Ying et al. |
| 9,354,803 B2 | 5/2016 | Ording et al. |
| 9,377,932 B2 | 6/2016 | Ying et al. |
| 2003/0097273 A1* | 5/2003 | Carpenter, Jr. ........ G06Q 10/06 705/301 |
| 2007/0150830 A1 | 6/2007 | Ording et al. |
| 2008/0155547 A1* | 6/2008 | Weber .................. G06Q 10/109 718/102 |
| 2011/0022985 A1 | 1/2011 | Ording et al. |
| 2013/0111395 A1 | 5/2013 | Ying et al. |
| 2014/0059482 A1 | 2/2014 | Won |
| 2014/0137032 A1 | 5/2014 | Won et al. |
| 2014/0337751 A1* | 11/2014 | Lim ...................... G06F 40/279 715/744 |
| 2015/0121297 A1 | 4/2015 | Ying et al. |
| 2015/0301697 A1* | 10/2015 | Petrell ................. G06F 3/04842 715/823 |
| 2015/0370432 A1 | 12/2015 | Ying et al. |
| 2016/0274757 A1 | 9/2016 | Ording et al. |
| 2018/0129392 A1* | 5/2018 | Ko ........................ G06F 3/0485 |

* cited by examiner

APPARATUS AND METHOD FOR VISUALLY PROVIDING INFORMATION REGARDING CONTENTS INDICATING TIME INTERVAL

CROSS-REFERENCE TO RELATED APPLICATION(S)

This application is based on and claims priority under 35 U.S.C. § 119 of a Korean patent application number 10-2017-0154059, filed on Nov. 17, 2017, in the Korean Intellectual Property Office, the disclosure of which is incorporated by reference herein its entirety.

BACKGROUND

1. Field

The disclosure relates to an apparatus and method for visually providing information regarding contents indicating a time interval.

2. Description of Related Art

An electronic device may execute an application for specifying a schedule or editing a video or a sound. When the application is executed, the electronic device may display contents with a predetermined length via a display to visually provide a time interval (e.g., a period of time or the length of playing time) to a user. As used herein, the term "contents" may refer to a user interface in the form of a bar that indicates a time interval. In addition, the electronic device may visually provide information regarding the displayed contents using text or an image. The information regarding the contents may include, for example, the title of a schedule, a place for a schedule, the title of a video, or the title of a sound that is related to the contents. The information regarding the contents may be displayed in the contents.

The above information is presented as background information only to assist with an understanding of the disclosure. No determination has been made, and no assertion is made, as to whether any of the above might be applicable as prior art with regard to the disclosure.

SUMMARY

In the related art, contents displayed on a screen of an electronic device may be scrolled according to a user input for scrolling the screen displayed (or a partial region thereof). In other words, the electronic device may provide an effect in which the contents move up, down, left, or right on the screen. Since information regarding the contents is fixedly displayed in a predetermined region of the contents, the information regarding the contents may move with the contents when a scroll operation takes place. The information regarding the contents may also disappear from the screen when the predetermined region of the contents, in which the information regarding the contents is located, disappears from the screen according to the scroll operation. In this case, a user of the electronic device may have to scroll the screen in a direction opposite the scrolling direction of the contents to view again the information that is not seen.

Aspects of the disclosure are to address at least the above-mentioned problems and/or disadvantages and to provide at least the advantages described below. Accordingly, an aspect of the disclosure is to provide an apparatus and method for continually displaying information regarding contents on a screen even while the contents indicating a time interval are scrolled.

Additional aspects will be set forth in part in the description which follows and, in part, will be apparent from the description, or may be learned by practice of the presented embodiments.

In accordance with an aspect of the disclosure, an electronic device is provided. The electronic device includes a display, at least one processor electrically connected to the display, and a memory electrically connected to the at least one processor and including instructions. The instructions, when executed by the at least one processor, cause the at least one processor to display contents indicating a time interval on a first region of a screen displayed by the display, display, in the contents, a text representing information regarding the contents, receive a user input for scrolling the first region, determine whether a part of the text is located on a second region included in the first region, and fix the text on the second region during a scroll operation according to the user input when the part of the text is located on the second region.

In accordance with another aspect of the disclosure, an electronic device is provided. The electronic device includes a display, at least one processor electrically connected to the display, and a memory electrically connected to the at least one processor and including instructions. The instructions, when executed by the at least one processor, cause the at least one processor to display contents indicating a time interval on a first region of a screen displayed by the display, display, in the contents, an image representing information regarding the contents, receive a user input for scrolling the first region, determine whether a part of the image is located on a second region included in the first region, and fix the image on the second region during a scroll operation according to the user input when the part of the image is located on the second region.

In accordance with another aspect of the disclosure, a method of an electronic device is provided. The method includes displaying contents indicating a time interval on a first region of a screen displayed by a display of the electronic device, displaying, in the contents, a text representing information regarding the contents, receiving a user input for scrolling the first region, determining whether a part of the text is located on a second region included in the first region, and fixing the text on the second region during a scroll operation according to the user input when the part of the text is located on the second region.

According to various embodiments of the disclosure, the electronic device may continually display information regarding contents on a screen while the contents indicating a time interval are scrolled, thereby providing convenience to a user who wants to view the information regarding the contents, and reducing the depth of a user operation.

In addition, the disclosure may provide various effects that are directly or indirectly recognized.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
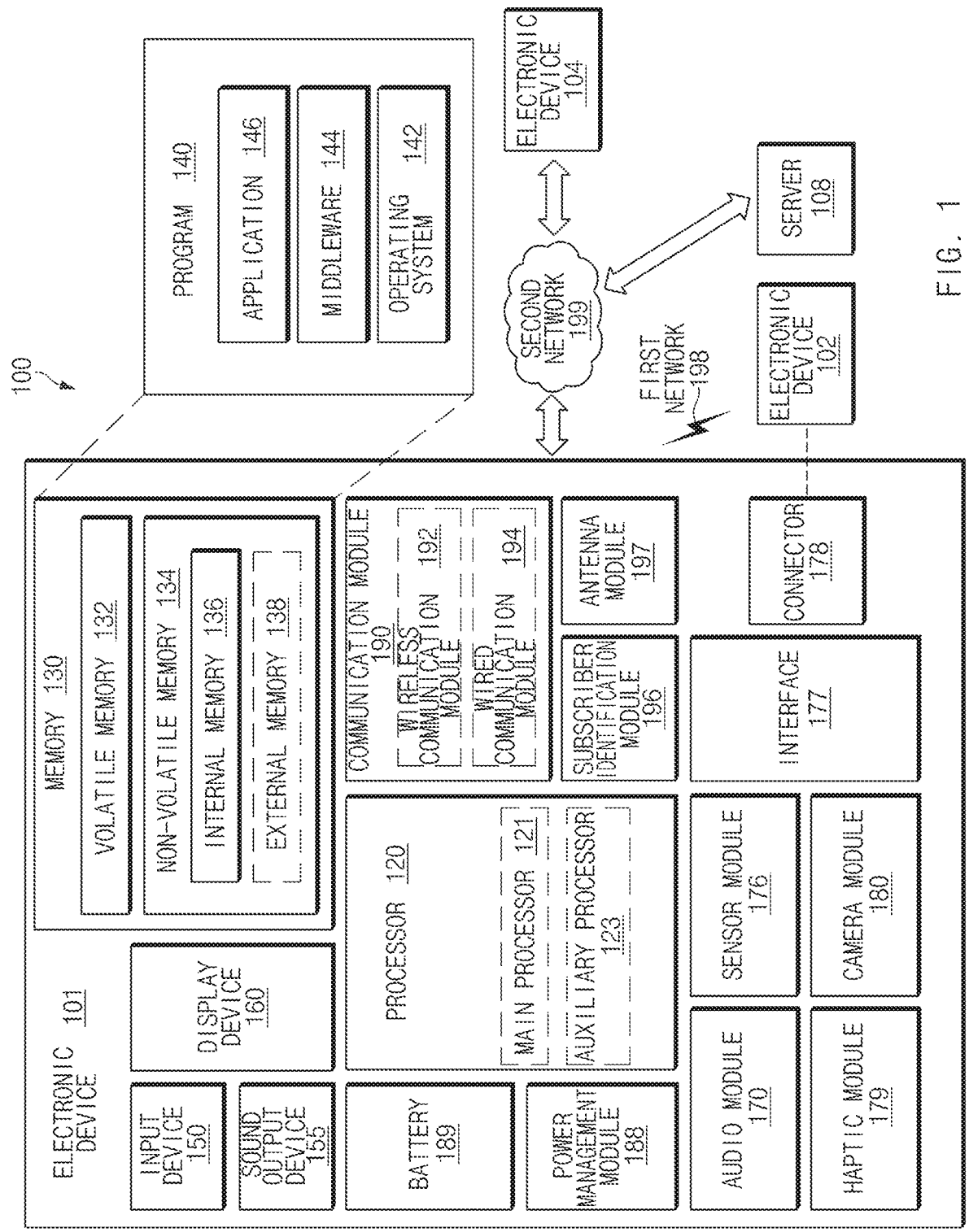
FIG. 1 is a block diagram illustrating an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his or her tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
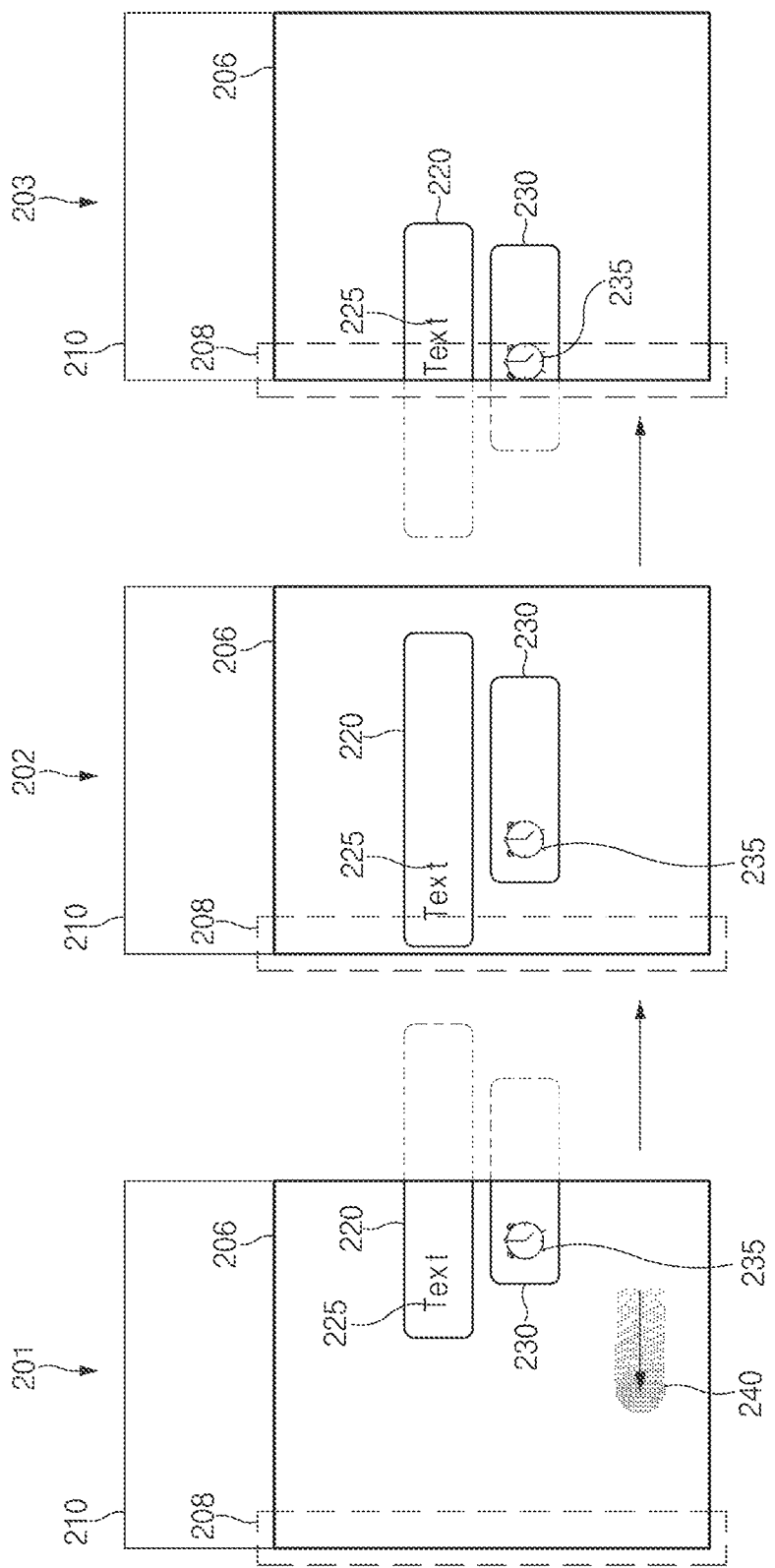
FIG. 2 is a view illustrating an operation of visually providing contents indicating time intervals and information regarding the contents according to an embodiment of the disclosure.

FIG. 2 is a view illustrating an operation of visually providing contents indicating time intervals and information regarding the contents according to an embodiment of the disclosure.

Referring to reference numeral 201 of FIG. 2, when an application (e.g., a calendar application, a video editing application, a sound editing application, or a movie editing application) is executed, the electronic device 101 may display contents 220 and 230 on a first region 206 of a screen 210 displayed by a display (e.g., the display device 160 of FIG. 1). The contents 220 and 230 may indicate time intervals (e.g., periods of time, dates, or lengths of playing time), respectively. The contents 220 and 230 may each include, for example, a timeline. For the convenience of description, FIG. 2 illustrates an example that both the contents 220 and the contents 230 are displayed. However, the number of contents that are displayed on the first region 206 is not limited to two. The electronic device 101 may display only one of the contents 220 and the contents 230, or may additionally display other contents not illustrated in FIG. 2.

According to an embodiment, the electronic device 101 may display a text 225 in the contents 220 to visually provide information regarding the contents 220. According to an embodiment, the electronic device 101 may display an image 235 in the contents 230 to visually provide information regarding the contents 230. The information regarding the contents 220 and 230 may include at least one of, for example, the title of a schedule, a place for a schedule, the title of a video or a sound, and the title of a movie.

According to an embodiment, the first region 206 may include a second region 208 for controlling a movement of the text 225 or the image 235. The second region 208 may be disposed, for example, on the leftmost side, the rightmost side, the uppermost side, or the lowermost side of the time intervals displayed on the first region 206, or on a region where the smallest time value (e.g., the earliest time or the least playing time) is displayed. For the convenience of description, FIG. 2 illustrates only the second region 208 disposed on a left side of the first region 206. However, the second region 208 has no limitation in number or position. The electronic device 101 may or may not display the second region 208 on the screen 210.

According to an embodiment, the electronic device 101 may receive a user input 240 for scrolling the first region 206 to the left. Upon the receipt of the user input 240, the first region 206 may be scrolled in the order of reference numerals 201, 202, and 203. For the convenience of description, FIG. 2 illustrates an example that the first region 206 is scrolled left. However, a scrolling direction of the first region 206 is not limited thereto. When the first region 206 is scrolled, the electronic device 101 may move the contents 220 and 230 included in the first region 206 in the scrolling direction of the first region 206.

According to an embodiment, when the contents 220 and 230 are scrolled left, the text 225 displayed in the contents 220 and the image 235 displayed in the contents 230 may also be scrolled in the scrolling direction of the first region 206. For example, referring to reference numeral 202, the electronic device 101 may move the text 225 and the image 235, together with the contents 220 and 230, to the left in response to the receipt of the user input 240 by the electronic device 101.

According to an embodiment, when at least part of the text 225 or the image 235 is located on the second region 208, the electronic device 101 may fix the text 225 or the image 235 on the second region 208 while the first region 206 is scrolled. For example, referring to reference numeral 203, when at least part of the text 225 is located on the second region 208, the electronic device 101 may move the text 225 inside the contents 220 in a direction opposite the scrolling direction of the first region 206 to fixedly display the text 225 on the second region 208. Under the control of the electronic device 101, the text 225 may be continually displayed on the second region 208 while the contents 220 on the screen 210 disappear to the left according to the scroll operation (e.g., while the contents 220 are clear cut). On a similar principle, when at least part of the image 235 is located on the second region 208, the electronic device 101 may fix the image 235 on the second region 208 while the contents 230 on the screen 210 disappear to the left according to the scroll operation.

Figure 3:
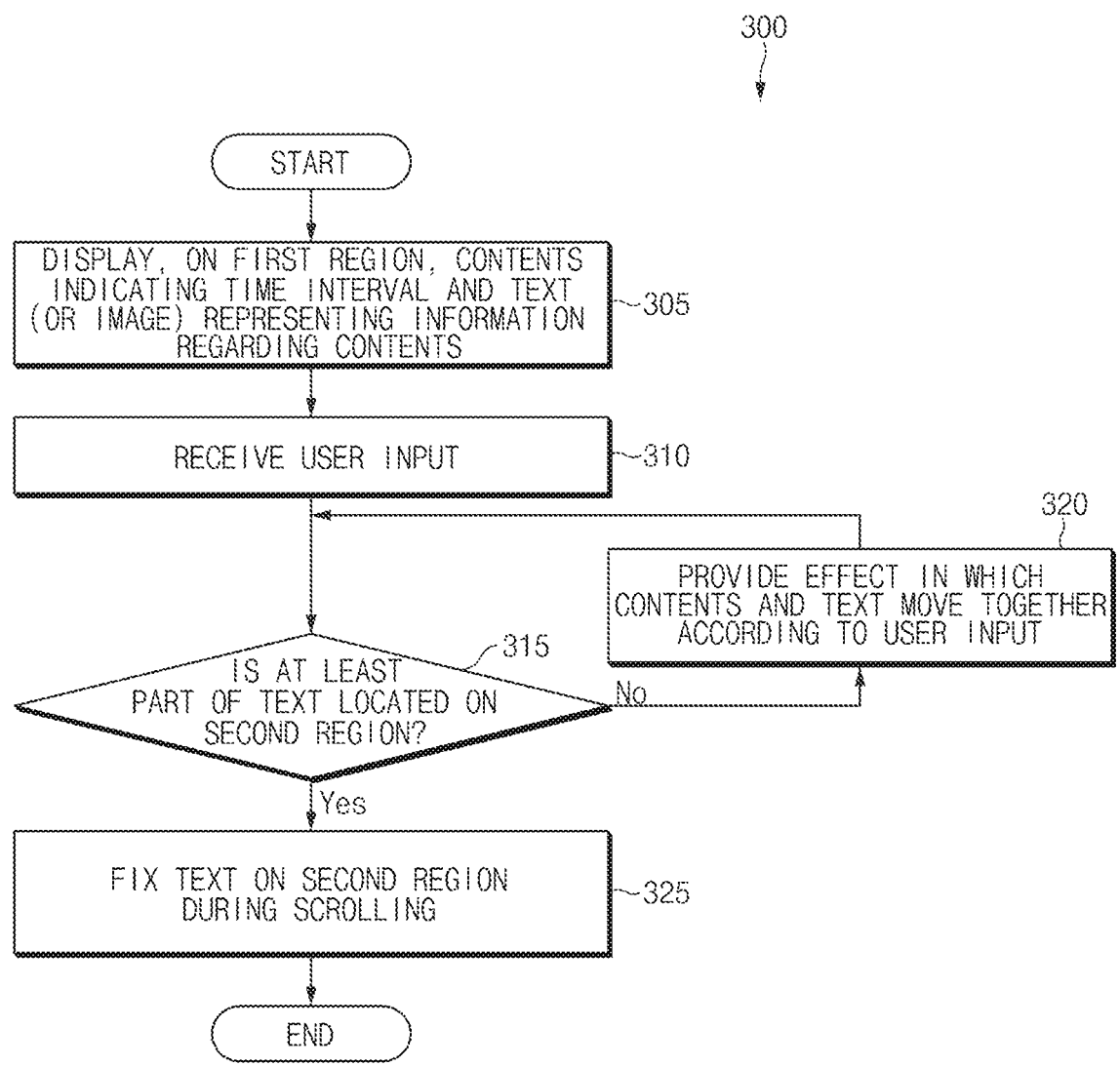
FIG. 3 is a flowchart illustrating an operation of visually providing contents indicating a time interval and information regarding the contents according to an embodiment of the disclosure.

FIG. 3 is a flowchart illustrating an operation of visually providing contents indicating a time interval and information regarding the contents according to an embodiment of the disclosure. For the convenience of description, only an embodiment of controlling a text will be described below. However, a similar principle may be applied to an embodiment of controlling an image. The following operations may be executed by the electronic device 101, or may be executed by the processor 120 based on instructions included in the memory 130.

Referring to FIG. 3, in operation 305 of a method 300, when an application is executed, the processor 120 (shown in FIG. 1) may display contents (e.g., the contents 220 of FIG. 2) that indicate a time interval, on a first region (e.g., the first region 206 of FIG. 2) of a screen (e.g., the screen 210 of FIG. 2) that is displayed by a display (e.g., the display device 160) and may display, in the contents, a text (e.g., the text 225 of FIG. 2) that represents information regarding the contents. For example, the first region may have a scrolling function. If the application executed in the electronic device 101 includes a calendar application, the information regarding the contents may include at least one of the title, a place, and a participant for a schedule that correspond to the contents. If the application executed in the electronic device 101 includes an application for editing music, the information regarding the contents may include the name (or title) of a sound that corresponds to the contents. If the application executed in the electronic device 101 includes an application for editing a video, the information regarding the contents may include at least one of the title of a video and the title of background music. When the information regarding the contents is displayed as an image, the image may include at least one of an image stored in the application, an image stored in a photo album folder in the electronic device 101, an emoticon, a sticker, and an emoji.

In operation 310, the processor 120 may receive a user input (e.g., the user input 240 of FIG. 2) for scrolling the first region. In response to the receipt of the user input, the processor 120 may, in operation 315, determine whether at least part of the text is located on a second region (e.g., the second region 208 of FIG. 2). The second region may be, for example, a region for controlling a movement of the text. The second region may be included in the first region. When the text or the image is not located on the second region, the processor 120 may, in operation 320, move the text and the contents on the screen in the scrolling direction.

When at least part of the text is located on the second region, the processor 120 may, in operation 325, fix the text on the second region while the first region is scrolled. For example, when the text is located on the second region, the processor 120 may move the text inside the contents in a direction opposite the scrolling direction of the first region, thereby preventing the text from departing from the second region.

According to the method 300 described above, a user of the electronic device 101 may consistently view the information regarding the contents on the screen of the application during scrolling.

Figure 4:
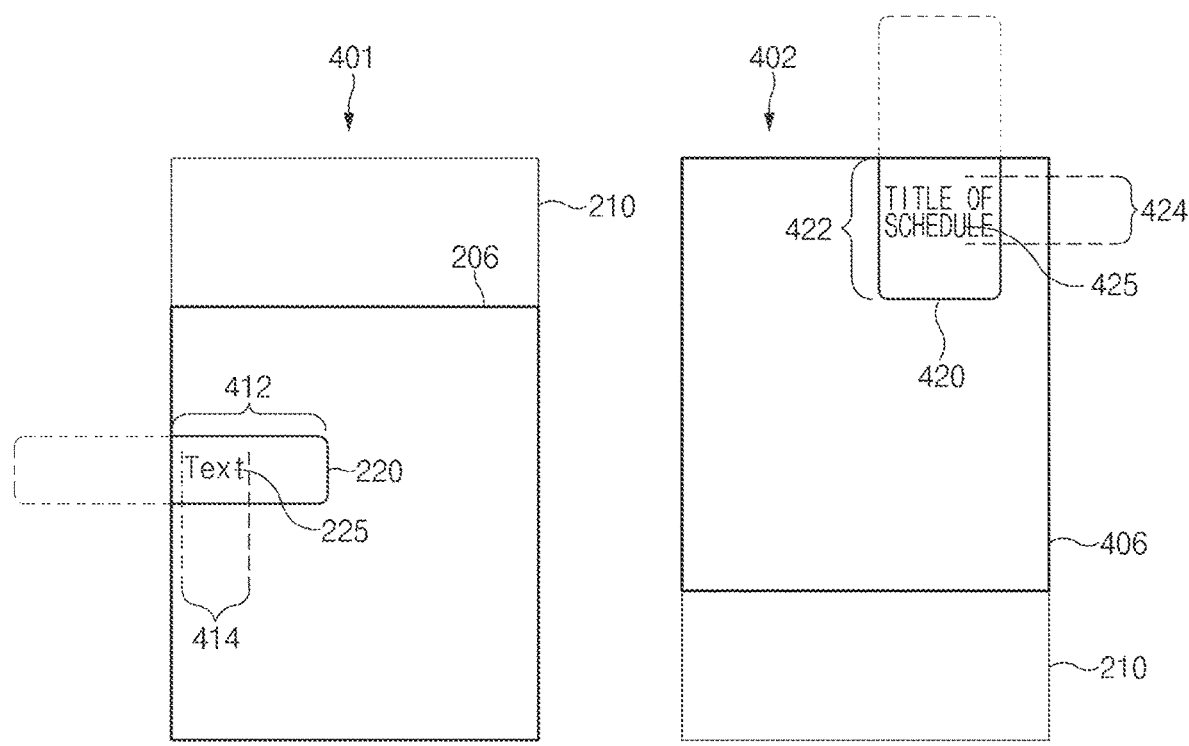
FIG. 4 is a view illustrating an operation of comparing the size of a text and the size of a remaining region of contents according to an embodiment of the disclosure.

FIG. 4 is a view illustrating an operation of comparing the size of a text and the size of a remaining region of contents according to an embodiment of the disclosure. Although FIG. 4 illustrates only an embodiment in which the electronic device 101 determines the size of a text, a similar principle may be applied to an embodiment of determining the size of an image.

Referring to FIG. 4, the electronic device 101 may determine the size of a text and the size of a region of contents that is left on the screen 210 while the first region 206 or a first region 406 is scrolled up, down, left, or right. For example, referring to reference numeral 401, the electronic device 101 may determine a horizontal length 412 (hereinafter, referred to as the first horizontal length 412) of a region of the contents 220 that is scrolled left and is left on the screen 210, and a horizontal length 414 (hereinafter, referred to as the second horizontal length 414) of the text 225. According to an embodiment, the second horizontal length 414 may be stored in the memory 130 in advance. The electronic device 101 may determine whether the second horizontal length 414 is longer than the first horizontal length 412 that is varied according to the scroll operation.

In another example, referring to reference numeral 402, the electronic device 101 may determine a vertical length 422 (hereinafter, referred to as the first vertical length 422) of a region of contents 420 that is scrolled up and is left on the screen 210, and a vertical length 424 (hereinafter, referred to as the second vertical length 424) of a text 425. According to an embodiment, the second vertical length 424 may be stored in the memory 130 in advance. The electronic device 101 may determine whether the second vertical length 424 is longer than the first vertical length 422 that is varied according to the scroll operation.

Figure 5:
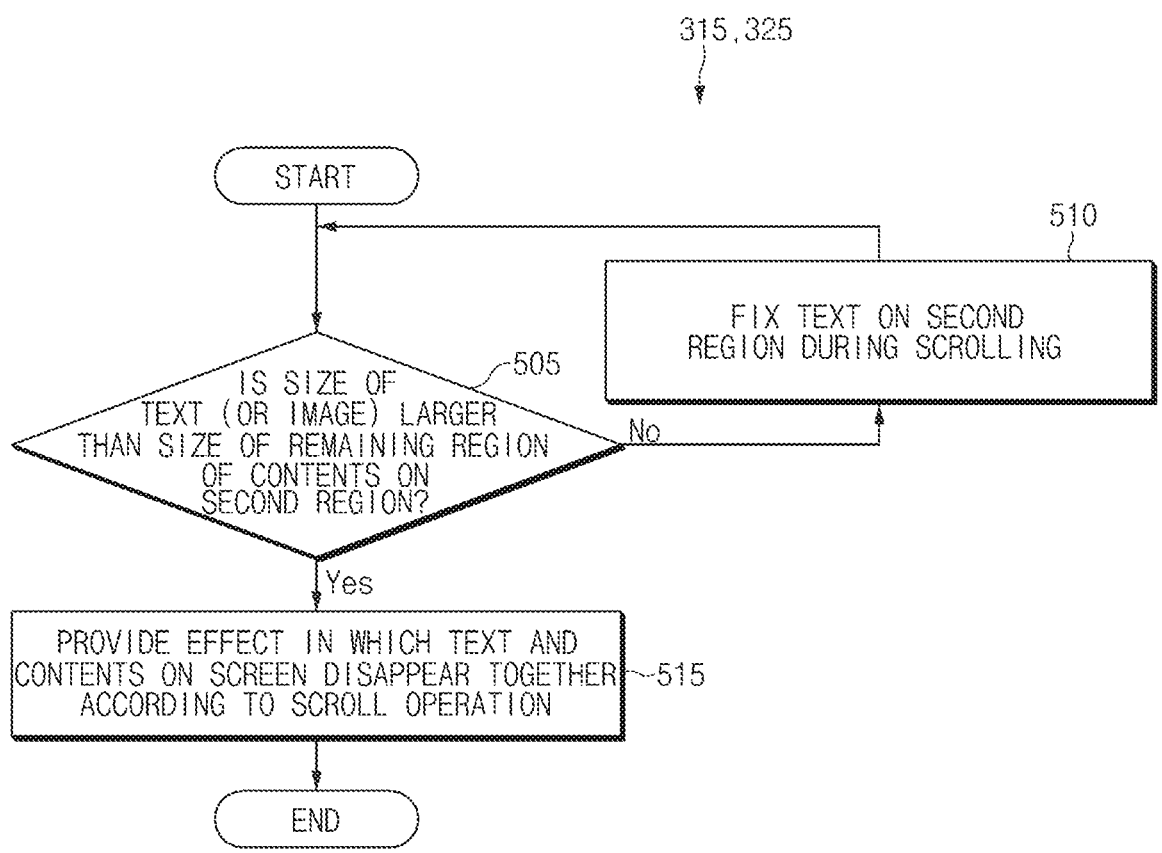
FIG. 5 is a flowchart illustrating an operation of moving a text based on the size of the text and the size of a remaining region of contents according to an embodiment of the disclosure.

FIG. 5 is a flowchart illustrating an operation of moving a text based on the size of the text and the size of a remaining region of contents according to an embodiment of the disclosure. The electronic device 101 may implement operations illustrated in FIG. 5 by more specifically limiting operations 315 and 325 of FIG. 3. For the convenience of description, only an embodiment of controlling a text will be described below. However, a similar principle may be applied to an embodiment of controlling an image.

Referring to FIG. 5, when at least part of a text (or an image) is located on a second region, the processor 120 may, in operation 505, determine whether the size of the text is larger than the size of a region of contents that is scrolled and left on a screen. For example, when a first region is scrolled left or right, the processor 120 may compare the horizontal length of the text and the horizontal length of the region of the contents. In another example, when the first region is scrolled up or down, the processor 120 may compare the vertical length of the text and the vertical length of the region of the contents.

When the size of the text is not larger than the size of the remaining region of the contents, the processor 120 may, in operation 510, fix the text on the second region while the first region is scrolled. When the size of the text is larger than the size of the remaining region of the contents, the processor 120 may, in operation 515, provide an effect (e.g., a clear-cut effect) in which the text and the contents on the screen disappear together according to the scroll operation.

Figure 6:
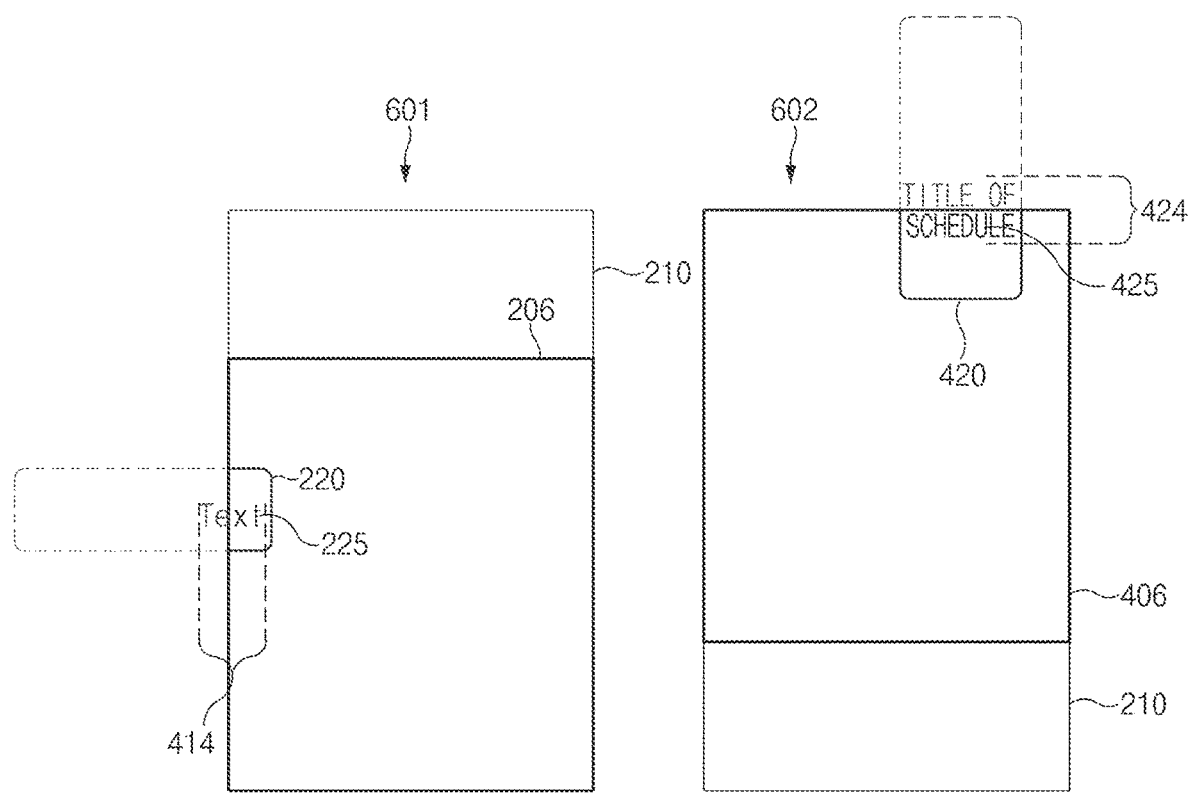
FIG. 6 is a view illustrating an operation of moving a text based on the size of the text and the size of a remaining region of contents according to an embodiment of the disclosure.

FIG. 6 is a view illustrating an operation of moving a text based on the size of the text and the size of a remaining region of contents according to an embodiment of the disclosure. FIG. 6 illustrates examples of operation 515 of FIG. 5.

Referring to FIG. 6, when the size of a text is larger than the size of a region of contents that is scrolled and left on the screen 210, the electronic device 101 may provide an effect in which the text and the contents on the screen 210 disappear together. For example, referring to reference numeral 601, since the horizontal length 414 of the text 225 is longer than the horizontal length of a region of the contents 220 that is scrolled left and is left on the screen 210, the electronic device 101 may allow the text 225 and the contents 220 to disappear together to the left according to the scroll operation. In another example, referring to reference numeral 602, since the vertical length 424 of the text 425 is longer than the vertical length of a region of the contents 420 that is scrolled up and is left on the screen 210, the electronic device 101 may allow the text 425 and the contents 420 to disappear upward (that is, to be scrolled up) together according to the scroll operation.

Figure 7:
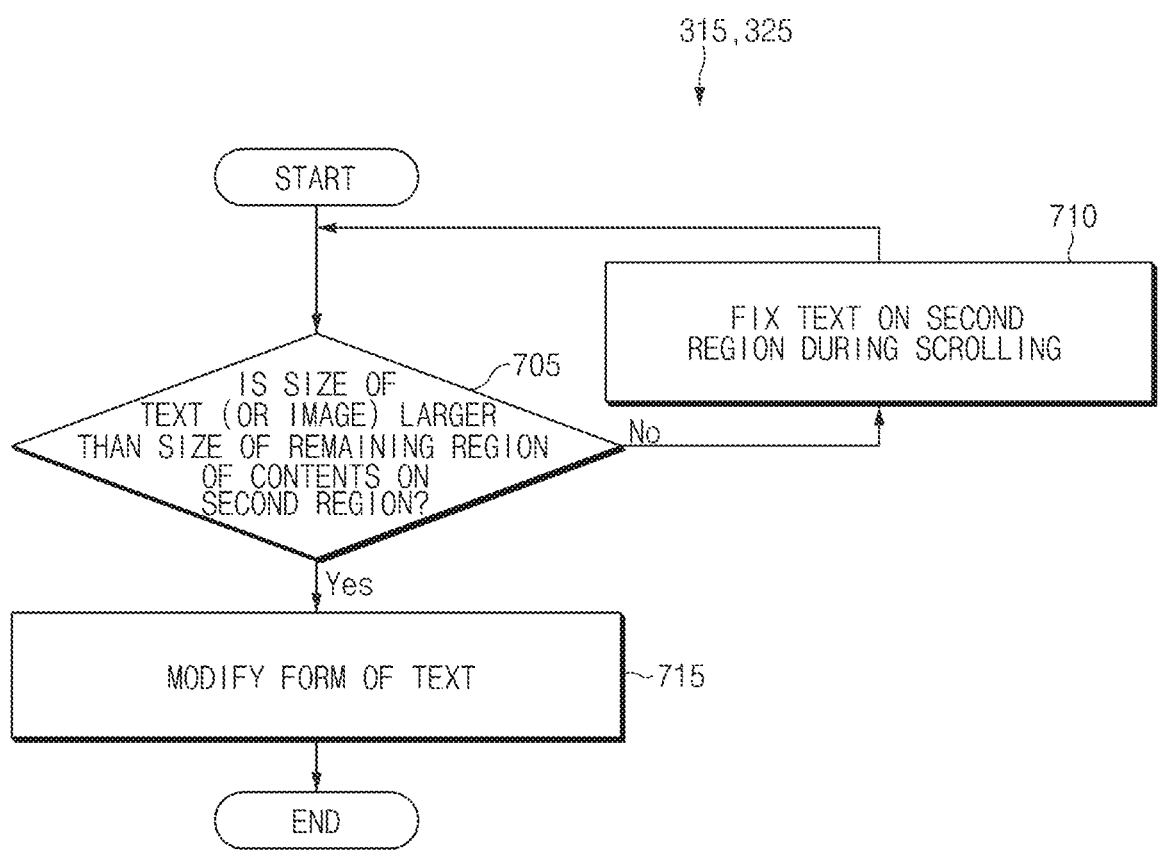
FIG. 7 is a flowchart illustrating an operation of modifying the form of a text based on the size of the text and the size of a remaining region of contents according to an embodiment of the disclosure.

FIG. 7 is a flowchart illustrating an operation of modifying the form of a text based on the size of the text and the size of a remaining region of contents according to an embodiment of the disclosure. The electronic device 101 may implement operations illustrated in FIG. 7 by more specifically limiting operations 315 and 325 of FIG. 3. For the convenience of description, only an embodiment of modifying a text will be described below. However, a similar principle may be applied to an embodiment of modifying an image.

Referring to FIG. 7, when a text is located on a second region, the processor 120 may, in operation 705, determine whether the size (e.g., the horizontal length or the vertical length) of the text is greater than the size of a region of contents that is scrolled and left on a screen. When the size of the text is not greater than the size of the remaining region of the contents, the processor 120 may, in operation 710, fix the text on the second region during scrolling.

When the size of the text is greater than the size of the remaining region of the contents, the processor 120 may, in operation 715, modify the form of the text. The form of the text may include, for example, the arrangement, the size, or the font of the text. By modifying the form of the text, the electronic device 101 may provide an effect in which the text is consistently displayed on the screen even though the size of the text is greater than the size of the remaining region of the contents due to the scroll operation.

Figure 8:
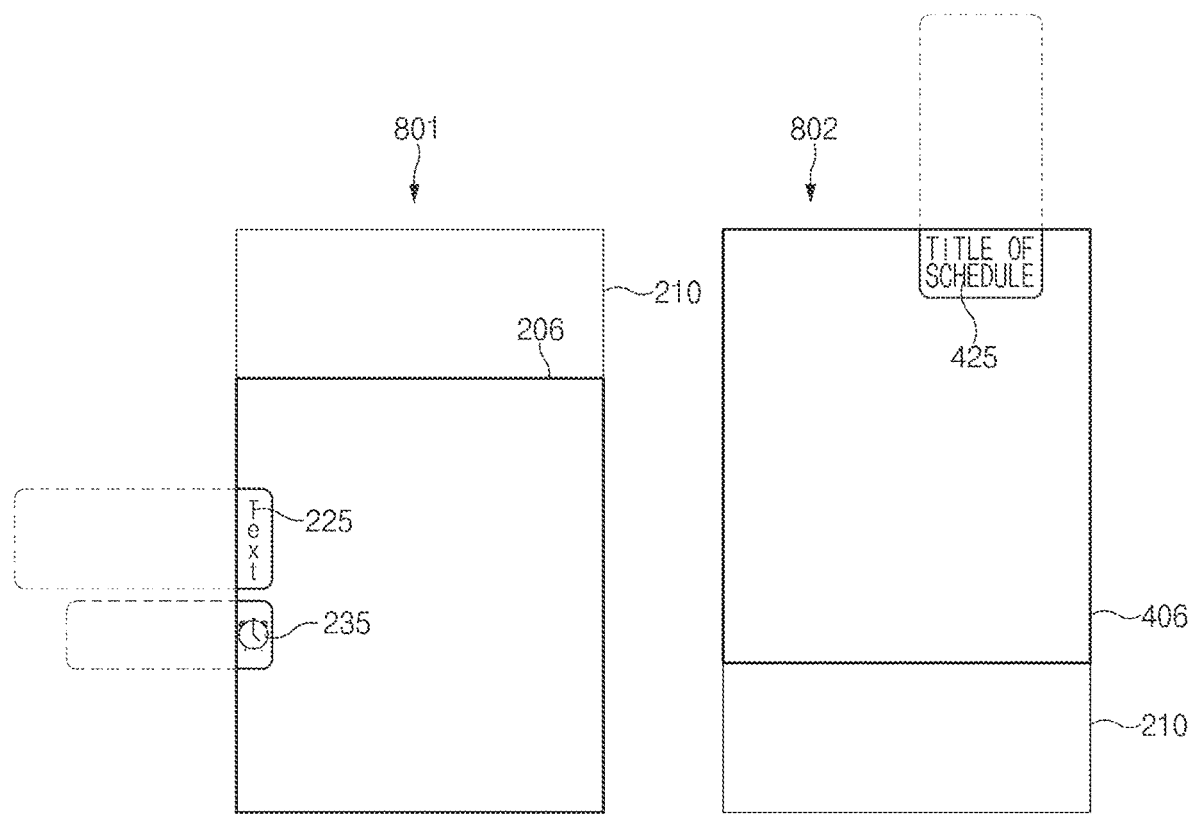
FIG. 8 is a view illustrating an operation of modifying the form of a text or an image based on the size of the text or the image and the size of a remaining region of contents according to an embodiment of the disclosure.

FIG. 8 is a view illustrating an operation of modifying the form of a text or an image based on the size of the text or the image and the size of a remaining region of contents according to an embodiment of the disclosure. FIG. 8 illustrates examples of operation 715 of FIG. 7.

Referring to FIG. 8, when the size of a text or an image is larger than the size of a region of contents that is scrolled and left on the screen 210, the electronic device 101 may modify the form of the text or the image. For example, referring to reference numeral 801, the electronic device 101 may modify the text 225 from a horizontal position to a vertical position. In another example, referring to reference numeral 801, the electronic device 101 may modify the shape of the image 235 to reduce the horizontal length of the image 235. In another example, referring to reference numeral 802, the electronic device 101 may decrease the size of the text 425.

Figure 9:
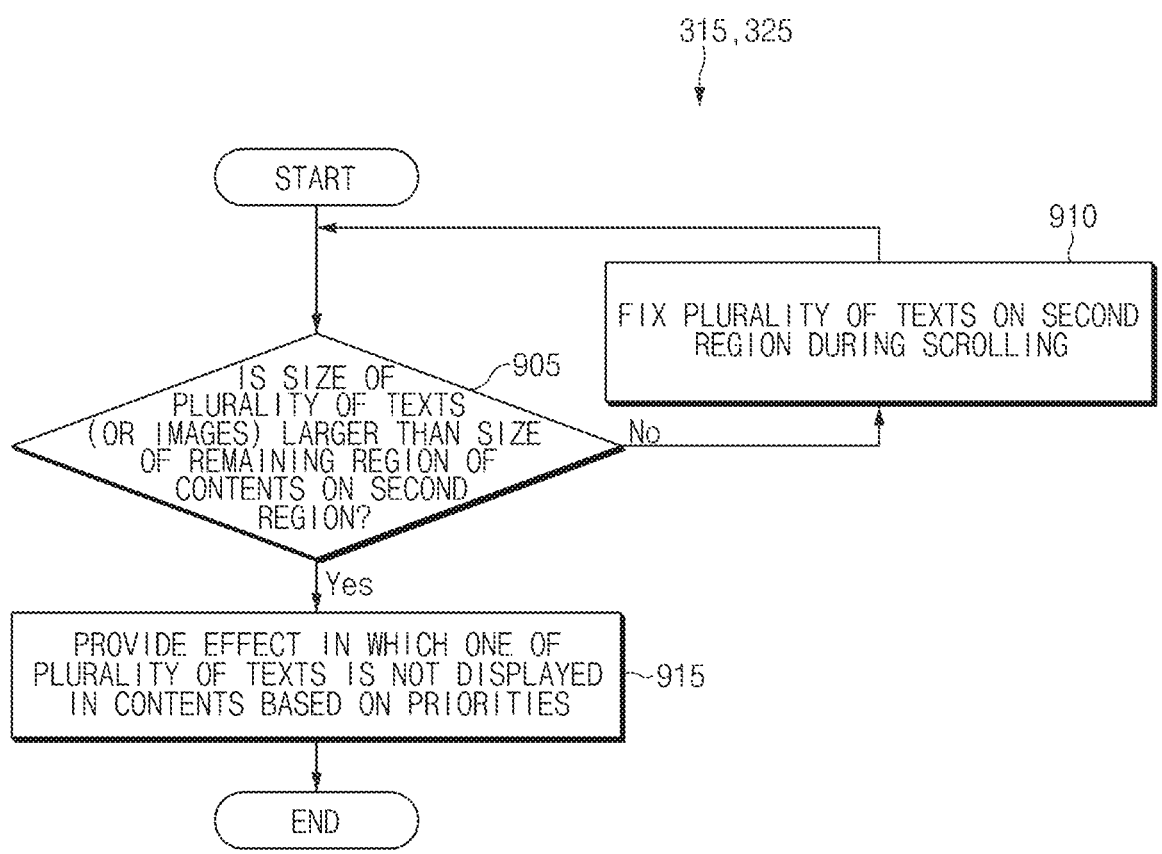
FIG. 9 is a flowchart illustrating an operation of controlling display of a plurality of texts based on the priorities of a plurality of pieces of information regarding contents according to an embodiment of the disclosure.

FIG. 9 is a flowchart illustrating an operation of controlling display of a plurality of texts based on the priorities of a plurality of pieces of information regarding contents according to an embodiment of the disclosure. The electronic device 101 may implement operations illustrated in FIG. 9 by more specifically limiting operations 315 and 325 of FIG. 3. For the convenience of description, only an embodiment of controlling display of texts will be described below. However, a similar principle may be applied to an embodiment of controlling display of images.

Referring to FIG. 9, when a plurality of texts displayed in contents are located on a second region, the processor 120 may, in operation 905, determine whether the size (e.g., the horizontal length or the vertical length) of the plurality of texts is greater than the size of a region of the contents that is scrolled and left on a screen. When the size of the plurality of texts is not greater than the size of the remaining region of the contents, the processor 120 may, in operation 910, fix the plurality of texts on the second region during scrolling.

When the size of the plurality of texts is greater than the size of the remaining region of the contents, the processor 120 may, in operation 915, provide an effect in which one of the plurality of texts in the contents disappears, based on the priorities of a plurality of pieces of information that are represented by the plurality of texts, respectively. The priorities of the plurality of pieces of information may be default values of an application executed in the electronic device 101 or values determined by a user input. For example, when a calendar application is executed in the electronic device 101 and a text representing the title of a schedule and a text representing a place for the schedule are displayed in contents, the processor 120 may provide an effect in which one of the texts in the contents disappears, based on the priorities of the title and the place for the schedule. Even while the contents including the plurality of pieces of information are scrolled, the electronic device 101 may consistently display the texts (or images) that represent high-priority information.

Figure 10:
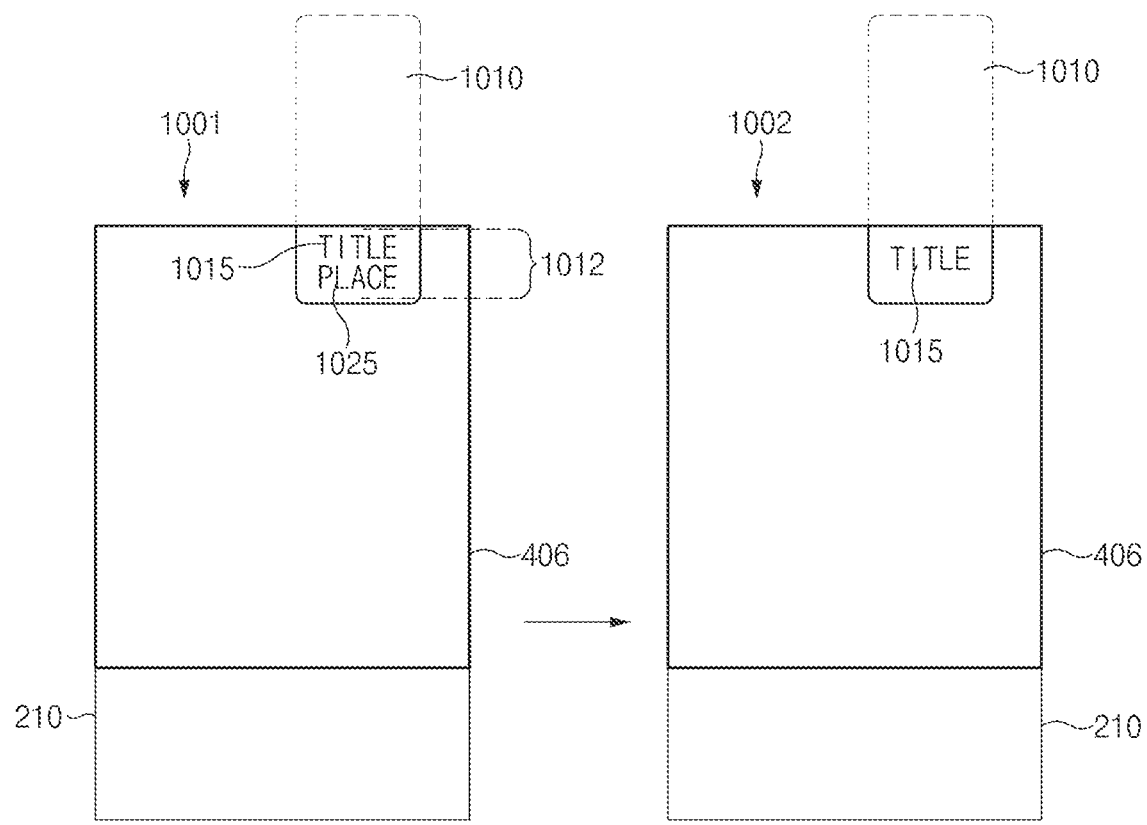
FIG. 10 is a view illustrating an operation of controlling display of a plurality of texts based on the priorities of a plurality of pieces of information regarding contents according to an embodiment of the disclosure.

FIG. 10 is a view illustrating an operation of controlling display of a plurality of texts based on the priorities of a plurality of pieces of information regarding contents according to an embodiment of the disclosure. FIG. 10 illustrates examples of operation 915 of FIG. 9. A similar principle may be applied to an operation of controlling display of a plurality of images.

Referring to reference numerals 1001 and 1002 of FIG. 10, the electronic device 101 may display, in contents 1010, a first text 1015 and a second text 1025 that represent different information. For example, the first text 1015 may represent the title of a schedule related to the contents 1010, and the second text 1025 may represent a place for the schedule related to the contents 1010. When a user input for scrolling up the first region 406 is received, the electronic device 101 may determine whether the vertical length 1012 of the first and second texts 1015 and 1025 is longer than the vertical length of a region of the contents 1010 that is scrolled and left on the screen 210.

According to an embodiment, when the vertical length 1012 is longer than the vertical length of the remaining region of the contents 1010 on the screen 210 and the information on the title of the schedule has a higher priority than the information on the place for the schedule, the electronic device 101 may allow the second text 1025, which represents the place for the schedule, not to be displayed in the contents 1010 when the first region 406 is scrolled. When the second text 1025 is not displayed in the contents 1010, the first text 1015 may be more consistently displayed on the screen 210, with an increase in space in which the first text 1015 is displayed in the contents 1010.

Figure 11A:
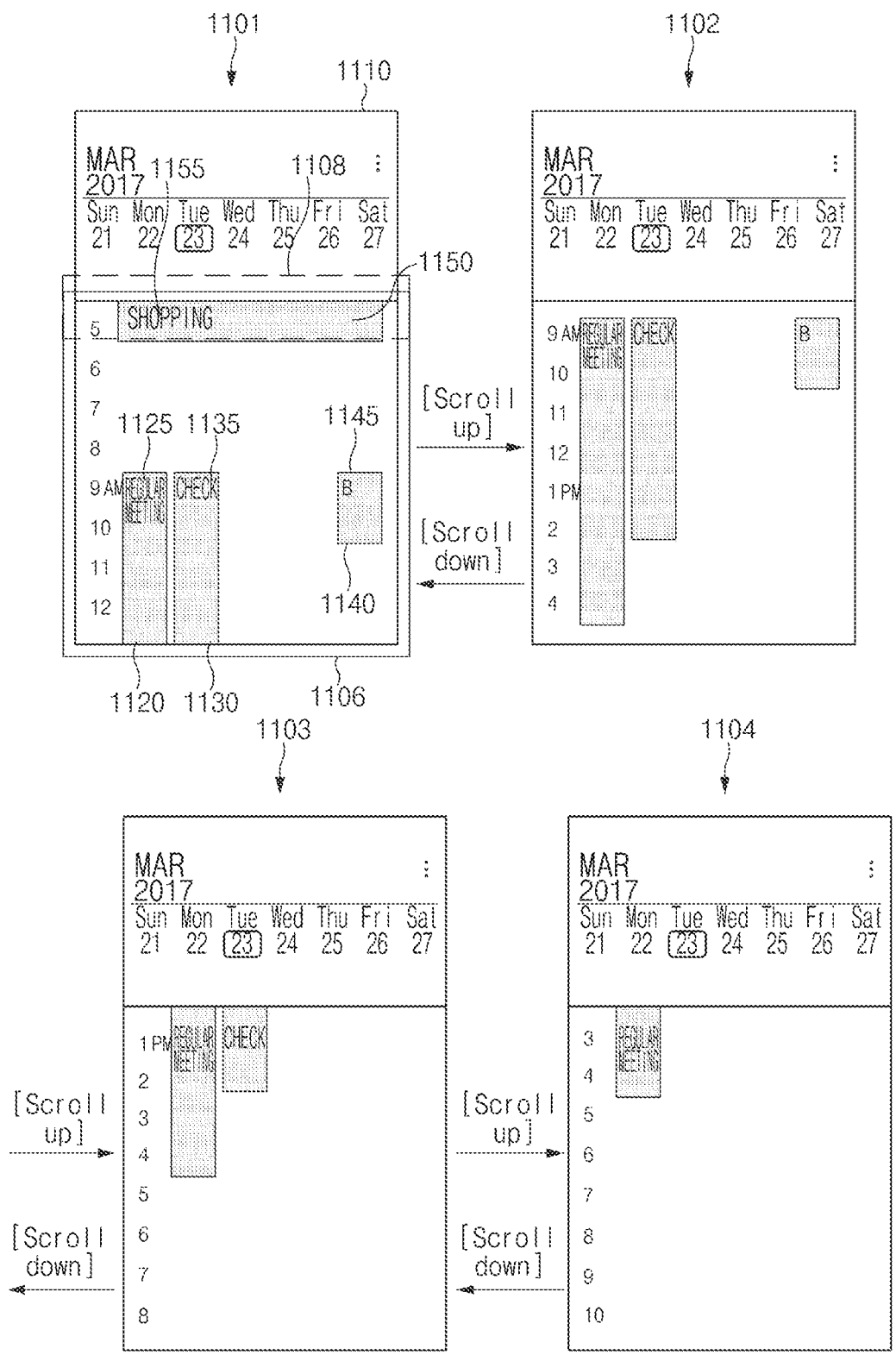
FIG. 11A is a view illustrating an operation of visually providing contents indicating time intervals and information regarding the contents in a calendar application according to an embodiment of the disclosure.

FIG. 11A is a view illustrating an operation of visually providing contents indicating time intervals and information regarding the contents in a calendar application according to an embodiment of the disclosure.

Referring to reference numeral 1101 of FIG. 11A, when a calendar application is executed, the electronic device 101 may display a first region 1106 having a scrolling function on a screen 1110 displayed by the calendar application. In response to user inputs for storing schedules, the electronic device 101 may display, on the first region 1106, contents 1120, 1130, 1140, and 1150 that indicate the schedules over time. In response to user inputs for storing information relating to the schedules, the electronic device 101 may display a text 1125 (e.g., "regular meeting"), a text 1135 (e.g., "check"), a text 1145 (e.g., "B"), and a text 1155 (e.g., "shopping") in the contents 1120, 1130, 1140, and 1150, respectively. When a user input for scrolling up the first region 1106 is received, the first region 1106 may be scrolled in the order of reference numerals 1101, 1102, 1103, and 1104.

Referring to reference numeral 1102, the contents 1150 and the text 1155 may not be displayed on the screen 1110 since the contents 1150 and the text 1155 depart from the first region 1106. The texts 1125, 1135, and 1145 may be scrolled together with the contents 1120, 1130, and 1140, respectively, since the texts 1125, 1135, and 1145 located in the contents 1120, 1130, and 1140 are not situated on a second region 1108 included in the first region 1106.

Referring to reference numeral 1103, the text 1145, together with the contents 1140, may not be displayed on the screen 1110 by the scroll operation due to a deficiency in space in which the text 1145 is to be displayed in the contents 1140. Since the texts 1125 and 1135 are located on the second region 1108, the texts 1125 and 1135 may be fixed on the second region 1108 while the contents 1120 and 1130 are scrolled up. For example, the electronic device 101 may move the texts 1125 and 1135 inside the contents 1120 and 1130 in a direction opposite the scrolling direction of the first region 1106, thereby providing an effect in which the texts 1125 and 1135 are consistently displayed without departing from the second region 1108.

Referring to reference numeral 1104, even though the text 1135 is located on the second region 1108, the text 1135 and the contents 1130 on the screen 1110 may disappear together due to a deficiency in space in which the text 1135 is to be displayed in the contents 1130. Since the text 1125 is located on the second region 1108 and space in which the text 1125 is to be displayed in the contents 1120 is present, the electronic device 101 may fix the text 1125 on the second region 1108 while the contents 1120 move upward.

Figure 11B:
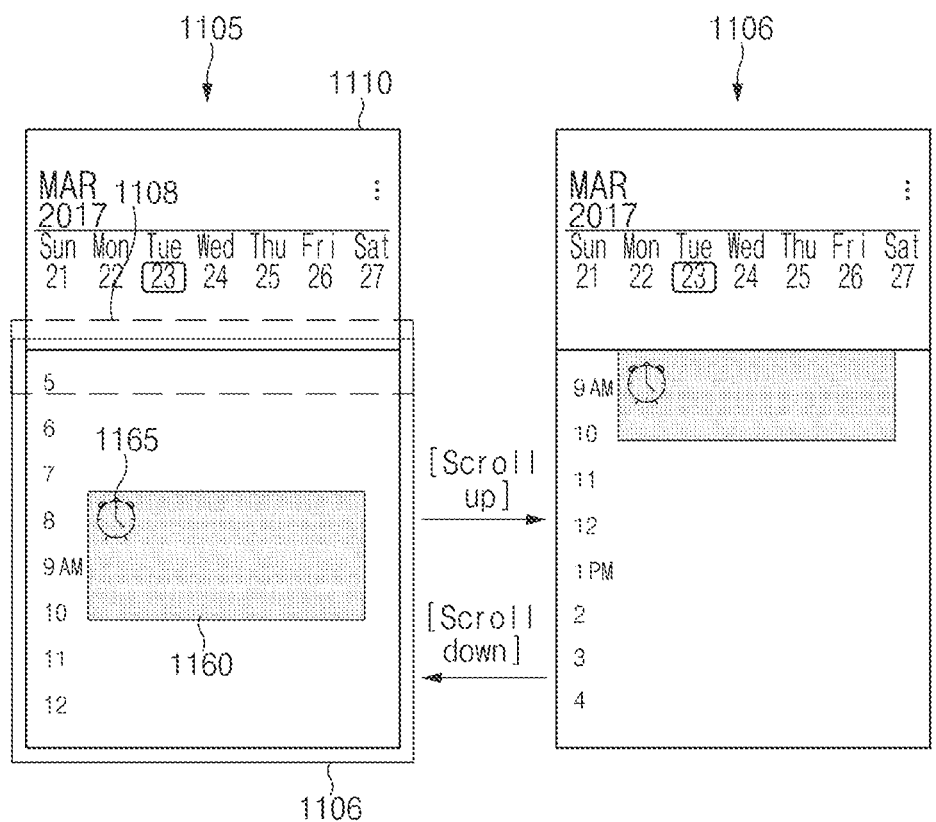
FIG. 11B is a view illustrating an operation of visually providing contents indicating a time interval and information regarding the contents in a calendar application according to an embodiment of the disclosure.

FIG. 11B is a view illustrating an operation of visually providing contents indicating a time interval and information regarding the contents in a calendar application according to an embodiment of the disclosure.

Referring to reference numeral 1105 of FIG. 11B, when a calendar application is executed, the electronic device 101 may display the first region 1106 on the screen 1110 and may display contents 1160 in the first region 1106. The contents 1160 may indicate a schedule according to time. In response to a user input for storing information relating to the schedule, the electronic device 101 may display an image 1165 (e.g., an image of a clock) in the contents 1160. When a user input for scrolling up the first region 1106 is received, the first region 1106 may be scrolled in the order of reference numerals 1105 and 1106.

Referring to reference numeral 1106, since the image 1165 is located on the second region 1108 and space in which the image 1165 is to be displayed in the contents 1160 is present, the electronic device 101 may fix the image 1165 on the second region 1108 while the contents 1160 move upward.

Figure 12:
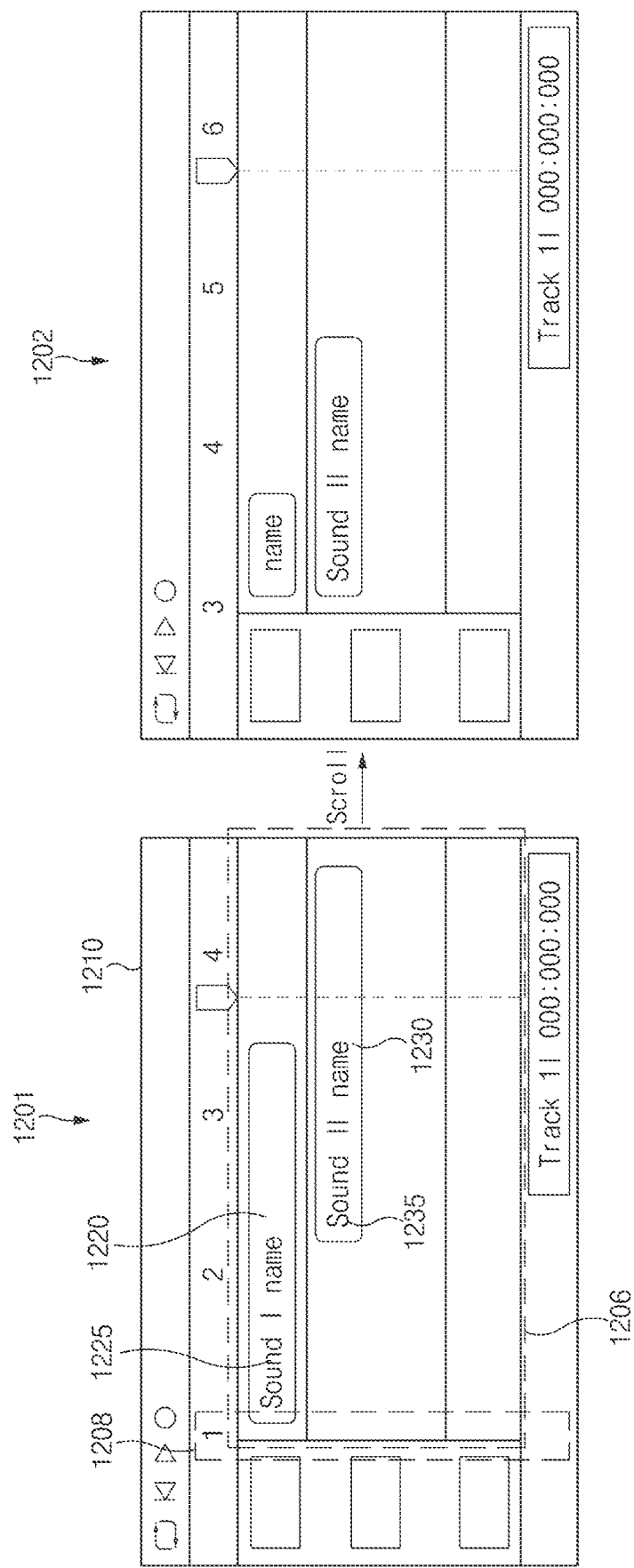
FIG. 12 is a view illustrating an operation of visually providing contents indicating time intervals and information regarding the contents in an application for editing a sound according to an embodiment of the disclosure.

FIG. 12 is a view illustrating an operation of visually providing contents indicating time intervals and information regarding the contents in an application for editing a sound according to an embodiment of the disclosure.

Referring to reference numeral 1201 of FIG. 12, when a sound editing application is executed, the electronic device 101 may display a first region 1206 having a scrolling function on a screen 1210 displayed by the application. In response to user inputs for storing sounds, the electronic device 101 may display, on the first region 1206, contents 1220 and 1230 that visually provide sound information according to playing time. In response to user inputs for storing information relating to the sounds, the electronic device 101 may display a text 1225 (e.g., "Sound I name") and a text 1235 (e.g., "Sound II name") in the contents 1220 and 1230, respectively. When a user input for scrolling the first region 1206 to the left is received, the first region 1206 may be scrolled in the order of reference numerals 1201 and 1202.

Referring to reference numeral 1202, even though the text 1225 is located on a second region 1208, the text 1225 and the contents 1220 on the screen 1210 may disappear together to the left according to the scroll operation due to a deficiency in space in which the text 1225 is to be displayed in the contents 1220. Since the text 1235 is located on the second region 1208 and space in which the text 1235 is to be displayed in the contents 1230 is present, the electronic device 101 may fix the text 1235 on the second region 1208 while the contents 1230 move leftward.

Figure 13:
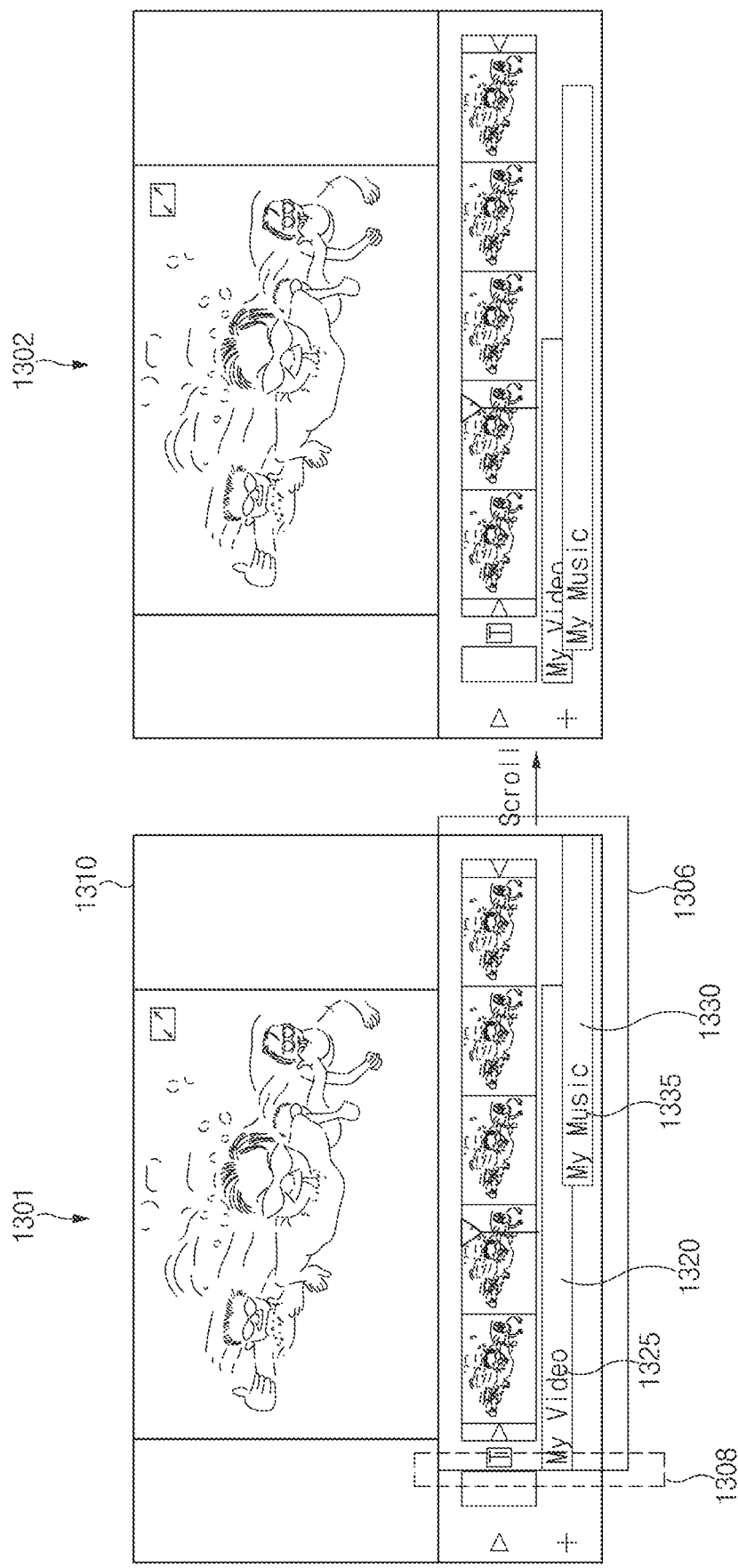
FIG. 13 is a view illustrating an operation of visually providing contents indicating time intervals and information regarding the contents in an application for editing a video according to an embodiment of the disclosure.

FIG. 13 is a view illustrating an operation of visually providing contents indicating time intervals and information regarding the contents in an application for editing a video according to an embodiment of the disclosure.

Referring to reference numeral 1301 of FIG. 13, when a video editing application is executed, the electronic device 101 may display a first region 1306 having a scrolling function on a screen 1310 displayed by the application. The electronic device 101 may display, on the first region 1306, a plurality of images and contents 1320 and 1330 indicating timelines of the respective images. The electronic device 101 may display a text 1325 (e.g., "My video") and a text 1335 (e.g., "My music") in the contents 1320 and 1330, respectively. The text 1325 and the text 1335 may represent information relating to the timelines. When a user input for scrolling the first region 1306 to the left is received, the first region 1306 may be scrolled in the order of reference numerals 1301 and 1302.

Referring to reference numeral 1302, since the text 1325 is located on a second region 1308 and space in which the text 1325 is to be displayed in the contents 1320 is present, the electronic device 101 may fix the text 1325 on the second region 1308 while the contents 1320 move leftward. Since the text 1335 is not located on the second region 1308, the electronic device 101 may move the text 1335 and the contents 1330 together in the scrolling direction.

An electronic device (e.g., the electronic device 101 of FIG. 1) may include a display (e.g., the display device 160 of FIG. 1), a processor (e.g., the processor 120 of FIG. 1) electrically connected to the display, and a memory (e.g., the memory of FIG. 1) electrically connected to the processor and including instructions. The instructions, when executed by the processor, may cause the processor to display contents indicating a time interval on a first region (e.g., the first region 206 of FIG. 2) of a screen displayed by the display, display, in the contents, a text representing information regarding the contents, receive a user input for scrolling the first region, determine whether at least part of the text is located on a second region included in the first region, and fix the text on the second region during a scroll operation according to the user input when the at least part of the text is located on the second region.

According to an embodiment, the information regarding the contents may include at least one of a title, a place, and a participant for a schedule, a name of a sound, a title of a movie, and a title of background music that correspond to the contents.

According to an embodiment, the instructions, when executed by the processor, may cause the processor to move the contents and the text together according to the user input when the text is not located on the second region.

According to an embodiment, the instructions, when executed by the processor, may cause the processor to compare a size of the text and a size of the contents left on the screen and to allow the text and the contents on the screen to disappear together according to the user input when the size of the text is larger than the size of the contents left on the screen.

According to an embodiment, the instructions, when executed by the processor, may cause the processor to compare a size of the text and a size of the contents left on the screen and to modify an arrangement of the text when the size of the text is larger than the size of the contents left on the screen.

According to an embodiment, the instructions, when executed by the processor, may cause the processor to compare a size of the text and a size of the contents left on the screen and to modify the size of the text when the size of the text is larger than the size of the contents left on the screen.

According to an embodiment, the second region may be disposed on at least one of the leftmost side, the rightmost side, the uppermost side, and the lowermost side of the first region.

According to an embodiment, the contents may include a plurality of texts that represent a plurality of pieces of information regarding the contents, respectively. The instructions, when executed by the processor, may cause the processor to compare a size of the plurality of texts and a size of the contents left on the screen and to allow one of the plurality of texts not to be displayed in the contents, based on priorities of the plurality of pieces of information, when the size of the plurality of texts is larger than the size of the contents left on the screen.

An electronic device (e.g., the electronic device 101 of FIG. 1) may include a display (e.g., the display device 160 of FIG. 1), a processor (e.g., the processor 120 of FIG. 1) electrically connected to the display, and a memory (e.g., the memory of FIG. 1) electrically connected to the processor and including instructions. The instructions, when executed by the processor, may cause the processor to display contents indicating a time interval on a first region of a screen displayed by the display, display, in the contents, an image representing information regarding the contents, receive a user input for scrolling the first region, determine whether at least part of the image is located on a second region included in the first region, and fix the image on the second region during a scroll operation according to the user input when the at least part of the image is located on the second region.

According to an embodiment, the image may include at least one of an icon, an emoji, and a sticker.

According to an embodiment, the instructions, when executed by the processor, may cause the processor to move the contents and the image together according to the user input when the image is not located on the second region.

According to an embodiment, the instructions, when executed by the processor, may cause the processor to compare a size of the image and a size of the contents left on the screen and to allow the image and the contents on the screen to disappear together according to the user input when the size of the image is larger than the size of the contents left on the screen.

According to an embodiment, the instructions, when executed by the processor, may cause the processor to compare a size of the image and a size of the contents left on the screen and to modify the size of the image when the size of the image is larger than the size of the contents left on the screen.

According to an embodiment, the contents may include a plurality of images that represent a plurality of pieces of information regarding the contents, respectively. The instructions, when executed by the processor, may cause the processor to compare a size of the plurality of images and a size of the contents left on the screen and to allow one of the plurality of images not to be displayed in the contents, based on priorities of the plurality of pieces of information, when the size of the plurality of images is larger than the size of the contents left on the screen.

According to an embodiment, the instructions, when executed by the processor, may cause the processor to compare a size of the image and a size of the contents left on the screen and to modify a form of the image when the size of the image is larger than the size of the contents left on the screen.

A method of an electronic device (e.g., the electronic device 101 of FIG. 1) may include displaying contents indicating a time interval on a first region of a screen displayed by a display of the electronic device, displaying, in the contents, a text representing information regarding the contents, receiving a user input for scrolling the first region, determining whether at least part of the text is located on a second region included in the first region, and fixing the text on the second region during a scroll operation according to the user input when the at least part of the text is located on the second region.

According to an embodiment, the method may further include moving the contents and the text together according to the user input when the text is not located on the second region.

According to an embodiment, the method may further include comparing a size of the text and a size of the contents left on the screen and modifying an arrangement of the text when the size of the text is larger than the size of the contents left on the screen.

According to an embodiment, the method may further include comparing a size of the text and a size of the contents left on the screen and modifying the size of the text when the size of the text is larger than the size of the contents left on the screen.

According to an embodiment, the contents may include a plurality of texts that represent a plurality of pieces of information regarding the contents, respectively. The method may further include comparing a size of the plurality of texts and a size of the contents left on the screen and allowing one of the plurality of texts not to be displayed in the contents, based on priorities of the plurality of pieces of information, when the size of the plurality of texts is larger than the size of the contents left on the screen.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a display;
   at least one processor electrically connected to the display; and
   a memory electrically connected to the at least one processor and including instructions,
   wherein the instructions, when executed by the at least one processor, cause the at least one processor to:
   display contents indicating a time interval on a first region of a screen displayed by the display,
   display, in the contents, a text representing information regarding the contents,
   receive a user input for scrolling the first region,
   determine whether a part of the text is located on a second region included in the first region,
   fix the text on the second region during a scroll operation according to the user input when the part of the text is located on the second region,
   compare a size of a first area in which the text occupies within the contents and a size of a second area remaining within contents on the screen, and
   allow the text and the contents on the screen to disappear together according to the user input when the size of the first area is larger than the size of the second area.

2. The electronic device of claim 1, wherein the information regarding the contents includes at least one of a title, a place, a participant for a schedule, a name of a sound, a title of a movie, or a title of background music that corresponds to the contents.

3. The electronic device of claim 1, wherein the instructions, when executed by the at least one processor, further cause the at least one processor to:
   move the contents and the text together according to the user input when the text is not located on the second region.

4. The electronic device of claim 3, wherein the instructions, when executed by the at least one processor, further cause the at least one processor to:
compare a size of the text and a size of the contents remaining on the screen; and
modify an arrangement of the text when the size of the text is larger than the size of the contents remaining on the screen.

5. The electronic device of claim 3, wherein the instructions, when executed by the at least one processor, further cause the at least one processor to:
compare a size of the text and a size of the contents remaining on the screen; and
modify the size of the text when the size of the text is larger than the size of the contents remaining on the screen.

6. The electronic device of claim 3,
wherein the contents include a plurality of texts that represent a plurality of pieces of information regarding the contents, respectively, and
wherein the instructions, when executed by the at least one processor, further cause the at least one processor to:
compare a size of the plurality of texts and a size of the contents remaining on the screen, and
prevent at least one of the plurality of texts from being displayed in the contents, based on priorities of the plurality of pieces of information when the size of the plurality of texts is larger than the size of the contents remaining on the screen.

7. The electronic device of claim 1, wherein the second region is disposed on at least one of a leftmost side, a rightmost side, an uppermost side, or a lowermost side of the first region.

8. An electronic device comprising:
a display;
at least one processor electrically connected to the display; and
a memory electrically connected to the at least one processor and including instructions,
wherein the instructions, when executed by the at least one processor, cause the at least one processor to:
display contents indicating a time interval on a first region of a screen displayed by the display,
display, in the contents, an image representing information regarding the contents,
receive a user input for scrolling the first region,
determine whether a part of the image is located on a second region included in the first region,
fix the image on the second region during a scroll operation according to the user input when the part of the image is located on the second region,
compare a size of a first area in which text occupies within the contents and a size of a second area remaining within contents on the screen, and
allow the text and the contents on the screen to disappear together according to the user input when the size of the first area is larger than the size of the second area.

9. The electronic device of claim 8, wherein the image includes at least one of an icon, an emoji, or a sticker.

10. The electronic device of claim 8, wherein the instructions, when executed by the at least one processor, further cause the at least one processor to:
move the contents and the image together according to the user input when the image is not located on the second region.

11. The electronic device of claim 10, wherein the instructions, when executed by the at least one processor, further cause the at least one processor to:
compare a size of the image and a size of the contents remaining on the screen; and
modify the size of the image when the size of the image is larger than the size of the contents remaining on the screen.

12. The electronic device of claim 10,
wherein the contents include a plurality of images that represent a plurality of pieces of information regarding the contents, respectively, and
wherein the instructions, when executed by the at least one processor, further cause the at least one processor to:
compare a size of the plurality of images and a size of the contents remaining on the screen, and
allow one of the plurality of images not to be displayed in the contents, based on priorities of the plurality of pieces of information when the size of the plurality of images is larger than the size of the contents remaining on the screen.

13. The electronic device of claim 8, wherein the instructions, when executed by the at least one processor, further cause the at least one processor to:
compare a size of the image and a size of the contents remaining on the screen; and
modify a form of the image when the size of the image is larger than the size of the contents remaining on the screen.

14. A method of an electronic device, the method comprising:
displaying contents indicating a time interval on a first region of a screen displayed by a display of the electronic device;
displaying, in the contents, a text representing information regarding the contents;
receiving a user input for scrolling the first region;
determining whether a part of the text is located on a second region included in the first region;
fixing the text on the second region during a scroll operation according to the user input when the part of the text is located on the second region;
comparing a size of a first area in which the text occupies within the contents and a size of a second area remaining within contents on the screen; and
allowing the text and the contents on the screen to disappear together according to the user input when the size of the first area is larger than the size of the second area.

15. The method of claim 14, further comprising:
moving the contents and the text together according to the user input when the text is not located on the second region.

16. The method of claim 15, further comprising:
comparing a size of the text and a size of the contents remaining on the screen; and
modifying an arrangement of the text when the size of the text is larger than the size of the contents remaining on the screen.

17. The method of claim 15, further comprising:
comparing a size of the text and a size of the contents remaining on the screen; and
modifying the size of the text when the size of the text is larger than the size of the contents remaining on the screen.

18. The method of claim 15,
wherein the contents include a plurality of texts that represent a plurality of pieces of information regarding the contents, respectively, and
wherein the method further comprises:
  comparing a size of the plurality of texts and a size of the contents remaining on the screen; and
  allowing one of the plurality of texts not to be displayed in the contents, based on priorities of the plurality of pieces of information when the size of the plurality of texts is larger than the size of the contents remaining on the screen.

19. The method of claim 15, further comprising:
when a portion of the text is not displayed in the first region or the second region, increasing size of the text that is displayed.

* * * * *